United States Patent
Utsuno (10) Patent No.: US 8,963,480 B2
(45) Date of Patent: Feb. 24, 2015

(54) CHARGING CONTROL SYSTEM AND DEVICE

(71) Applicant: LAPIS Semiconductor Co., Ltd., Yokohama (JP)

(72) Inventor: Kikuo Utsuno, Miyazaki (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 0 days.

(21) Appl. No.: 14/270,948

(22) Filed: May 6, 2014

(65) Prior Publication Data

US 2014/0232321 A1 Aug. 21, 2014

Related U.S. Application Data

(63) Continuation of application No. 13/271,174, filed on Oct. 11, 2011, now Pat. No. 8,729,850.

(30) Foreign Application Priority Data

Oct. 12, 2010 (JP) ................................. 2010-229810

(51) Int. Cl.
  *H02J 7/00* (2006.01)
  *H01M 10/44* (2006.01)
  *H01L 31/00* (2006.01)
  *H02J 7/35* (2006.01)

(52) U.S. Cl.
  CPC . *H02J 7/355* (2013.01); *H02J 7/35* (2013.01); *Y02E 10/566* (2013.01); *H02J 7/0072* (2013.01)
  USPC ............ 320/101; 320/102; 320/103; 136/252

(58) Field of Classification Search
  USPC ............................ 320/101, 102, 103; 136/252
  See application file for complete search history.

(56) References Cited

U.S. PATENT DOCUMENTS

| 4,240,021 | A | 12/1980 | Kashima et al. |
| 4,243,928 | A | 1/1981 | Nazimek |
| 4,296,489 | A | 10/1981 | Mitsui |
| 5,085,526 | A * | 2/1992 | Sawtell et al. ................ 374/101 |
| 6,803,742 | B1 | 10/2004 | Visciano |
| 6,992,463 | B2 | 1/2006 | Yoshio |
| 7,406,367 | B2 * | 7/2008 | Uno ................................. 701/1 |
| 8,682,600 | B2 * | 3/2014 | Genta ............................. 702/51 |
| 8,729,850 | B2 * | 5/2014 | Utsuno ......................... 320/102 |
| 2008/0143292 | A1 | 6/2008 | Ward |
| 2009/0266397 | A1 | 10/2009 | Gibson et al. |
| 2009/0302681 | A1 | 12/2009 | Yamada et al. |

FOREIGN PATENT DOCUMENTS

JP 09-261861 A 10/1997

* cited by examiner

*Primary Examiner* — M'Baye Diao
(74) *Attorney, Agent, or Firm* — Rabin & Berdo, P.C.

(57) ABSTRACT

A charging control system for charging a secondary battery from a solar battery, including a first path for transmitting power from the solar battery to the secondary battery, a second path for sensing the voltage of the secondary battery, and a comparison unit for comparing the solar battery voltage with the sensed voltage of the secondary battery. The first path includes a first interrupter, controlled by the comparison unit, which interrupts the first path to prevent discharge of the secondary battery through the solar battery when the solar battery voltage falls below the secondary battery voltage. The second path includes a second interrupter that interrupts the second path after the first path is interrupted, to prevent the secondary battery from discharging through the second path when not being charged through the first path.

10 Claims, 9 Drawing Sheets

CHARGING CONTROL SYSTEM AND DEVICE

CROSS-REFERENCE TO RELATED APPLICATIONS

This is a continuation of application 13/271,174, filed Oct. 11, 2011, and moreover claims the benefit of foreign priority of Japanese application 2010/229810, filed Oct. 12, 2010. The disclosures of both of these prior applications are incorporated herein by reference.

BACKGROUND OF THE INVENTION

1. Field of the Invention

The present invention relates to a charging control system and a charging control device for controlling the charging of a secondary battery from a solar battery and reducing the loss of power from the secondary battery when the charging path is interrupted.

2. Description of the Related Art

A known type of charging control system, disclosed by Yamada et al. in Japanese Patent Application Publication No. 9-261861, controls the charging of a secondary battery from a solar battery by means of a switching element that prevents the secondary battery from discharging through the solar battery when not being charged by the solar battery.

Figure 1:
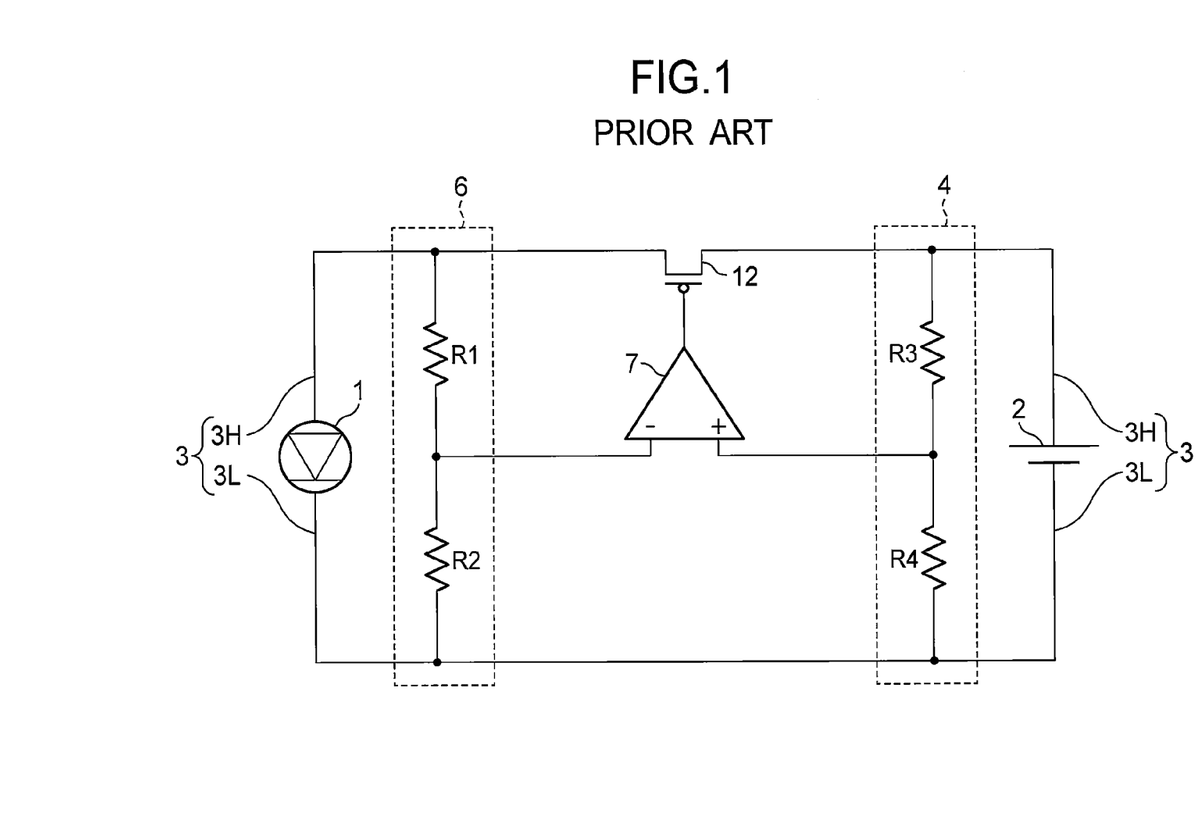
FIG. 1 is a circuit diagram schematically illustrating a conventional charging control system.

The circuit configuration of this charging control system is shown very schematically in FIG. 1. The main elements are a solar battery 1, a secondary battery 2, and a charging path 3 interconnecting the solar battery 1 and secondary battery 2. For clarity, reference characters 3H and 3L are used to distinguish the side of the charging path 3 interconnecting the anodes of the solar battery 1 and secondary battery 2 from the side of the charging path 3 interconnecting the cathodes of the solar battery 1 and secondary battery 2. The system also includes a current path 4 interconnecting the high side charging path 3H and low side charging path 3L through resistors R1 and R2, a current path 6 interconnecting the high side charging path 3H and low side charging path 3L through resistors R3 and R4, a comparator 7 for comparing the voltage of the solar battery 1 as divided by resistors R1 and R2 with the voltage of the solar battery 1 as divided by resistors R3 and R4, and a p-channel metal-oxide-semiconductor (PMOS) transistor 12 inserted in high side charging path 3H between current path 4 and current path 6 to interrupt the charging path 3 responsive to the output of the comparator 7. The secondary battery 2, part of the charging path 3, and current path 4 form a closed circuit.

This conventional system operates as follows. The comparator 7 compares the voltage of the secondary battery 2 as divided by resistors R3 and R4 on current path 4 with the voltage of the solar battery 1 as divided by resistors R1 and R2 on current path 6. If the difference between the voltage of the solar battery 1 and voltage of the secondary battery 2 exceeds a threshold value, the comparator 7 outputs a low-level signal to turn on the PMOS transistor 12, thereby charging the secondary battery 2 from the solar battery 1; if the difference is equal to or less than the threshold value, the comparator 7 outputs a high-level signal to turn off the PMOS transistor 12, thereby interrupting the charging of the secondary battery 2 from the solar battery 1.

A problem in this conventional charging control system is that even when the switching element is turned off to interrupt the charging of the secondary battery from the solar battery, current continues to flow from the anode of the secondary battery 2 to the cathode of the secondary battery 2 through current path 4, thereby discharging the secondary battery 2 and wasting some of the power stored in the secondary battery 2.

SUMMARY OF THE INVENTION

An object of the present invention is to provide a charging control system and a charging control device that reduce the loss of power from the secondary battery when the charging path from the solar battery to the secondary battery is interrupted.

A charging control system according to the present invention includes a solar battery, a secondary battery, a first path for transmitting power output from the solar battery to the secondary battery to charge the secondary battery, a second path connected to the first path and forming a closed circuit in combination with the secondary battery and part of the first path, and a comparison unit connected to the second path. The comparison unit compares the output voltage of the solar battery with the output voltage of the secondary battery, as sensed on the second path.

The first path includes a first interrupter that interrupts the first path responsive to an output of the comparison unit to prevent the secondary battery from discharging through the solar battery when the output voltage of the solar battery is less than the output voltage of the secondary battery.

The second path includes a second interrupter that interrupts the second path when the output voltage of the solar battery drops below a predetermined level after the first path is interrupted, to prevent discharge of the secondary battery through the second path.

The first interrupter may be a transistor. The second interrupter may be a current source that ceases operation when the output voltage of the solar battery falls below the predetermined level.

A charging control device according to the present invention includes a comparator, a first path with a first interrupter, and a second path with a second interrupter as described above, and electrodes for connecting the first path to a solar battery and a secondary battery.

By interrupting the second path, the second interrupter prevents loss of power from the secondary battery by discharge through the second path after the first path has been interrupted by the first interrupter and the secondary battery is not being charged by the solar battery.

DETAILED DESCRIPTION OF THE INVENTION

Embodiments of the invention will now be described with reference to the attached drawings, in which like elements are indicated by like reference characters.

First Embodiment

Figure 2:
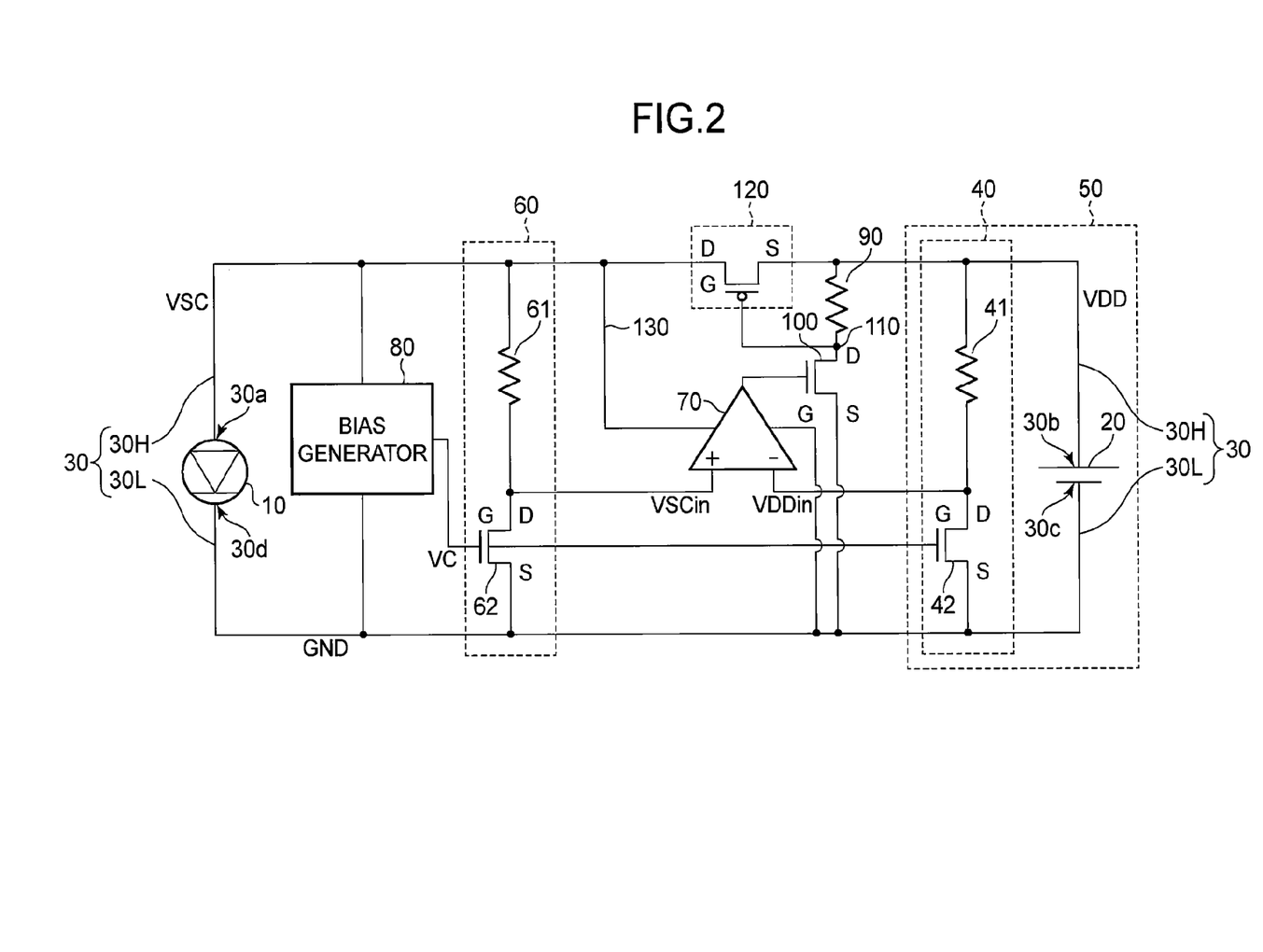
FIG. 2 is a circuit diagram illustrating a charging control system according to a first embodiment of the invention.

Referring to FIG. 2, the charging control system according to the first embodiment includes a solar battery 10, a secondary battery 20, a first path 30 interconnecting the solar battery 10 and secondary battery 20, a second path 40 connected to the first path 30 and forming a closed circuit 50 in combination with the secondary battery 20 and part of the first path 30, a third path 60 connected to the first path 30 and forming another closed circuit in combination with the solar battery 10 and part of the first path 30, a comparator 70 for comparing the voltage output from the solar battery 10 with the voltage output from the secondary battery 20, a bias generator 80, a resistance element 90, and an n-channel metal-oxide-semiconductor (NMOS) transistor 100. The first path 30 includes a p-channel metal-oxide-semiconductor (PMOS) transistor 120 as a first interrupter for interrupting the first path 30 when the comparator 70 determines that the voltage output from the solar battery 10 is equal to or lower than the voltage output from the secondary battery 20. The second path 40 includes an NMOS transistor 42 as a second interrupter for interrupting the second path 40 as the voltage of the solar battery 10 drops further after the first path 30 is interrupted.

The solar battery 10 is a power generating means that absorbs sunlight incident on a solar panel (not shown) and converts the absorbed sunlight to electrical power.

The secondary battery 20 is a power storage means that stores power supplied from the solar battery 10.

The solar battery 10, secondary battery 20, and first path 30 form a closed circuit in which the power generated by the solar battery 10 is supplied to the secondary battery 20. The first path 30 has two sections: a high side section 30H extending from the anode 30a of the solar battery 10 to the anode 30b of the secondary battery 20, and a low side section 30L extending from the cathode 30c of the secondary battery 20 to the cathode 30d of the solar battery 10. Since there are no resistance elements or switching elements in the low side section 30L, the entire low side section 30L is always at substantially a single potential referred to below as the ground potential or zero volts (0 V).

The second path 40 also includes a first resistance element 41 connected in series with NMOS transistor 42. One end of resistance element 41 is connected to the high side section 30H of the first path 30. The other end of resistance element 41 is connected to the drain D of NMOS transistor 42. The source S of NMOS transistor 42 is connected to the low side section 30L of the first path 30. The second path 40 is accordingly connected to the first path 30 in parallel with the secondary battery 20. In the closed circuit 50 including the secondary battery 20, part of the first path 30, and the second path 40, the NMOS transistor 42 operates as a constant current source controlled by a bias voltage VC supplied from the bias generator 80, and the resistance element 41 and NMOS transistor 42 form a voltage sensor that senses the output voltage of the secondary battery 20.

The third path 60 includes a second resistance element 61 and an NMOS transistor 62 connected in series. The third path 60 is connected to the first path 30 at a position between the solar battery 10 and the second path 40. One end of resistance element 61 is connected to the high side section 30H of the first path 30. The other end of resistance element 61 is connected to the drain D of NMOS transistor 62. The source S of NMOS transistor 62 is connected to the low side section 30L of the first path 30. The third path 60 is accordingly connected to the first path 30 in parallel with the solar battery 10. NMOS transistor 62 operates as a constant current source controlled by the voltage VC supplied from the bias generator 80, and the resistance element 61 and NMOS transistor 62 form a voltage sensor that senses the output voltage of the solar battery 10. NMOS transistor 62 also operates as a third interrupter.

The inverting input terminal (−) of the comparator 70 is connected to a node at which resistance element 41 and NMOS transistor 42 are interconnected in the second path 40. The non-inverting input terminal (+) of the comparator 70 is connected to a node at which resistance element 61 and NMOS transistor 62 are interconnected in the third path 60. The secondary battery voltage sensed by resistance element 41 and NMOS transistor 42 is therefore input to the inverting input terminal of the comparator 70 and the solar battery voltage sensed by resistance element 61 and NMOS transistor 62 is input to the non-inverting input terminal of the comparator 70.

The voltage output by the solar battery 10 will be denoted VSC. The voltage sensed by resistance element 61 and NMOS transistor 62 will be referred to as the input solar battery voltage VSCin. The voltage output by the secondary battery 20 will be denoted VDD. The voltage sensed by resistance element 41 and NMOS transistor 42 will be referred to as the input secondary battery voltage VDDin.

The comparator 70 compares the input solar battery voltage VSCin with the input secondary battery voltage VDDin. The signal output by the comparator 70 is high (VSC) when VSCin is higher than VDDin (VSCin>VDDin), and low (0 V) when VSCin is equal to or lower than VDDin (VSCin≤VDDin).

The bias generator 80, receives power from the solar battery 10 via the first path 30 and generates the bias voltage VC that is applied to the gates G of NMOS transistors 42 and 62. Since their gates are held at the same potential, NMOS transistors 42 and 62 form a current mirror, drawing identical currents simultaneously through resistors 41 and 61. The input voltages VSCin and VDDin received by the comparator 70 are equal to VSC and VDD minus the voltage drops in resistors 41 and 61.

Since the bias generator 80 generates the bias voltage VC from the voltage output by the solar battery 10, when the solar battery 10 does not generate power, due to darkness, for example, the biasing of NMOS transistors 42 and 62 halts. In this state the bias voltage VC drops to substantially the ground level of the low side section 30L of the first path 30, the level, turning off NMOS transistors 42 and 62, so that no current flows through the second path 40 and third path 60.

Resistance element 90 operates as a third resistance element. One terminal of resistance element 90 is connected to the high side section 30H of the first path 30. The other terminal of resistance element 90 is connected at a node 110 to the drain D of NMOS transistor 100. The source S of NMOS transistor 100 is connected to the low side section 30L of the first path 30. The gate G of NMOS transistor 100 receives the output of the comparator 70. Resistance element 90 and NMOS transistor 100 operate as an NMOS inverter that inverts the output of the comparator 70.

PMOS transistor 120 is a switching element that interrupts the circuit formed by the solar battery 10, secondary battery 20, and first path 30 under given conditions to stop the supply of power from the solar battery 10 to the secondary battery 20. PMOS transistor 120 is inserted in series in the high side section 30H of the first path 30 at a point between the points at which the third path 60 and resistance element 90 are connected to the high side section 30H. Resistance element 90 is connected to the high side section 30H at a point between the secondary battery 20 and PMOS transistor 120. PMOS transistor 120 has its source S connected to the part of the high side section 30H leading to the secondary battery 20, its drain D connected to the part of the high side section 30H leading to the solar battery 10, and its gate G connected to the node 110 between resistance element 90 and the drain of NMOS transistor 100.

PMOS transistor 120 accordingly interrupts electrical conduction on the high side section 30H of the first path 30 responsive to the output of the comparator 70. When the output of the comparator 70 is high, NMOS transistor 100 turns on and the potential at node 110 drops to the ground potential of the low side section 30L of the first path 30. The signal applied from node 110 to the gate G of PMOS transistor 120 therefore goes low and PMOS transistor 120 turns on. Conversely, when the output of the comparator 70 is low, NMOS transistor 100 turns off and the potential at node 110 is pulled up to the anode potential of the secondary battery 20. The signal applied from node 110 to the gate G of PMOS transistor 120 therefore goes high, turning PMOS transistor 120 off. In short, PMOS transistor 120 and NMOS transistor 100 turn on and off together. The secondary battery 20 is charged from the solar battery 10 when PMOS transistor 120 is turned on and is not charged when PMOS transistor 120 is turned off.

Figure 3:
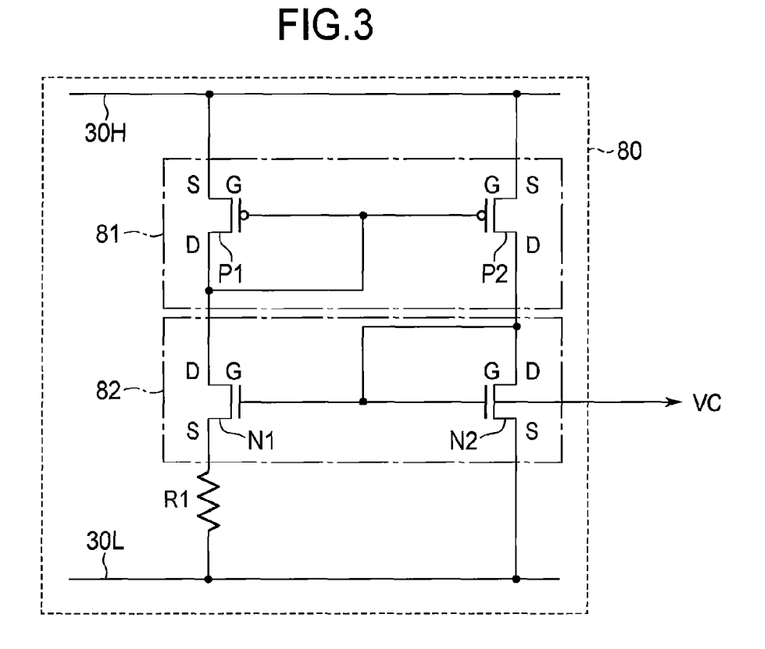
FIG. 3 is a circuit diagram illustrating the structure of the bias generator in FIG. 2 in more detail.

Referring to FIG. 3, the bias generator 80 includes a first current mirror circuit 81, a second current mirror circuit 82, and a resistor R1. The first current mirror circuit 81 includes a pair of PMOS transistors P1, P2. The second current mirror circuit 82 includes a pair of NMOS transistors N1, N2.

PMOS transistors P1, P2 both have their sources S connected to the high side section 30H of the first path 30 and their gates G connected to the drain D of PMOS transistor P1. The drain D of NMOS transistor N1 is also connected to the drain D of PMOS transistor P1; the drain D of NMOS transistor N2 is connected to the drain D of PMOS transistor P2. The source of NMOS transistor N1 is connected to one end of resistor R1. The other end of resistor R1 is connected to the low side section 30L of the first path 30. The source S of NMOS transistor N2 is connected directly to the low side section 30L of the first path 30. The gates G of NMOS transistors N1, N2 are interconnected and are both connected to the drain D of NMOS transistor N2, from which the bias voltage VC is output to the gates of NMOS transistors 42 and 62. The currents conducted by NMOS transistors 42 and 62 accordingly minor the currents conducted by NMOS transistors N1 and N2.

The bias voltage VC is normally held at a constant level in relation to the ground level of the low side section 30L of the first path 30. This constant level is a design choice that depends on the electrical characteristics of PMOS transistors P1, P2 and NMOS transistors N1, N2 and the resistance value of resistor R1.

Figure 4:
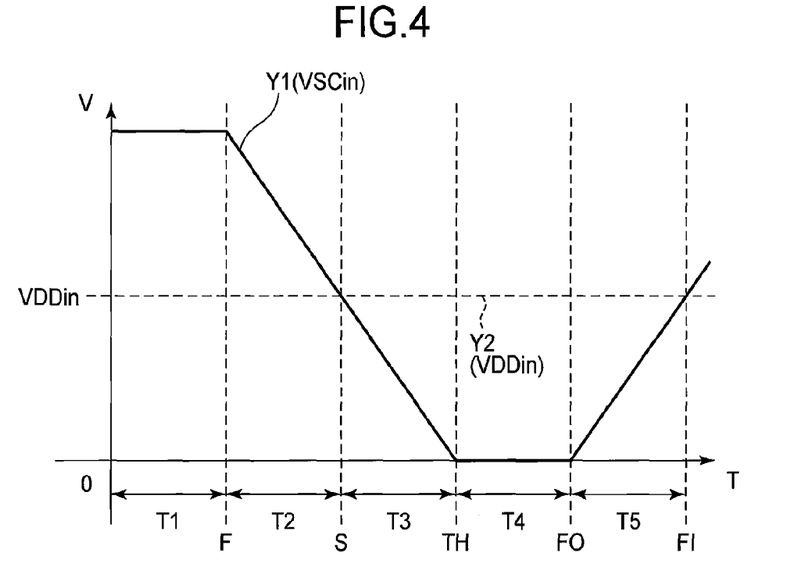
FIG. 4 is a timing diagram illustrating the charging state of the charging control system in the first embodiment.

The operation of the charging control system in the first embodiment will now be described with reference to FIG. 4. The graph in FIG. 4 shows temporal changes in the inputs to the comparator 70: the input solar battery voltage VSCin (solid line Y1) and the input secondary battery voltage VDDin (dotted line Y2). The vertical axis indicates the input voltage values (V) and the horizontal axis indicates time (T).

Periods T1, T2, T3, T4, T5 and times F, S, TH, FO, Fl are indicated on the horizontal axis. Time F is the boundary between periods T1 and T2, S is the boundary between T2 and T3, TH is the boundary between T3 and T4, FO is the boundary between T4 and T5, and H is the end of period T5.

In period T1, the solar battery 10 receives ample sunlight and outputs a higher voltage than the secondary battery voltage. The output of the solar battery 10 also enables the bias generator 80 to generate a constant bias voltage that turns on NMOS transistors 42 and 62. Current from the secondary battery 20 flows through the second path 40 and current from the solar battery 10 flows through the third path 60. Since the solar battery voltage VSC is greater than the secondary battery voltage VDD (VSC>VDD) in period T1, the input solar battery voltage VSCin is higher than the input secondary battery voltage VDDin (VSCin>VDDin). Accordingly, the output from the comparator 70 is high, which turns on NMOS transistor 100 and drops the potential at node 110 to the potential of the low side section 30L. The signal applied to the gate G of PMOS transistor 120 is therefore low and PMOS transistor 120 is turned on, whereby power is supplied to the secondary battery 20 from the solar battery 10 via the first path 30.

In periods T2, T3, and T4, the solar panel receives diminishing sunlight, or none, and the output voltage VSC of the solar battery 10 drops correspondingly.

In the period T2 between times F and S, the solar battery voltage VSC remains higher than the secondary battery voltage VDD (VSC>VDD). As in period T1, current flows through the second path 40 from the solar battery 10 and through the third path 60 from the secondary battery 20. The input solar battery voltage VSCin remains higher than the input secondary battery voltage VDDin (VSCin>VDDin), PMOS transistor 120 remains turned on, and power continues to be supplied to the secondary battery 20 from the solar battery 10 via the first path 30.

At time S, the input solar battery voltage VSCin becomes equal to the input secondary battery voltage VDDin (VSCin=VDDin). In the following periods T3 and T4, the input solar battery voltage VSCin is lower than the input secondary battery voltage VDDin (VSCin<VDDin).

At time S the output from the comparator 70 goes low, turning off NMOS transistor 100 and pulling up the potential at node 110 to the anode potential of the secondary battery 20. The voltage applied to the gate G of PMOS transistor 120 therefore goes high, turning off PMOS transistor 120 and interrupting the flow of power to the secondary battery 20 from the solar battery 10 via the first path 30.

In the conventional charging control system, however, some current continues to flow from the secondary battery 20 on the second path 40 constituting a closed circuit in combination with the secondary battery 20 and the first path 30, after time S when the first path 30 from the solar battery 10 to the secondary battery 20 is interrupted. The conventional charging control system thus has a problem of unwanted loss of power from the secondary battery 20 during period during which the solar panel does not receive sunlight after time S.

In contrast, in the charging control system according to the first embodiment, at time TH and during period T4 during which the solar panel does not receive sunlight, the bias generator 80 stops supplying power to each gate G of NMOS transistor 42 of the second path 40 and NMOS transistor 62 of the third path 60, thereby turning off the NMOS transistors 42 and 62, interrupting the flow of current on the second path 40 by NMOS transistor 42 and interrupting the flow of current the third path 60 by NMOS transistor 62. Accordingly, at time TH and during period T4, NMOS transistors 42 and 62 are switched off, and therefore the secondary battery 20 and the second path 40 form no closed circuit and there is no current flowing to the second path 40 from the secondary battery 20. For this reason, unwanted loss of power from the secondary battery 20 is avoided.

In addition, during the initial part of period T3, the bias generator 80 continues to output the same constant bias voltage VC as in periods T1 and T2, so NMOS transistors 42, 62 on the second path 40 and third path 60 remain switched on and the comparator 70 continues to receive input voltages VSCin and VDDin corresponding to the voltages of the solar battery 10 and secondary battery 20.

By time TH, however, the output voltage VSC of the solar battery 10 has become so low that the bias voltage output by the bias generator 80 approaches zero volts, turning off NMOS transistors 42 and 62 and interrupting the flow of current on the second path 40 and third path 60.

The inverting input terminal of the comparator 70 now receives the anode voltage (VDD) of the secondary battery 20, which is transmitted through resistor 41 without a voltage drop, while the non-inverting input terminal of the comparator 70 receives the solar battery voltage VSC, which is transmitted through resistor 61 without a voltage drop. Since VSC is less than VDD, the output of the comparator 70 remains low and transistors 100 and 120 remain turned off.

As the rises in input voltages VSCin and VDDin to the VSC and VDD levels that occur when transistors 42 and 62 switch off do not alter the comparator output, for simplicity, these rises are not shown in FIG. 4.

In the initial part of the transitional period T3 from time S to time TH, although the charging path (the first path 30) from the solar battery 10 to the secondary battery 20 is interrupted, some current continues to flow from the anode 30b to the cathode 30c of the secondary battery 20 on the second path 40. This transitional period is typically short: shorter than one second, for example, if the solar panel abruptly ceases to receive sunlight. Power loss from the secondary battery 20 on the second path 40 during period T3 is therefore slight, and power loss during the typically much longer period T4, when NMOS transistor 42 is turned off, is substantially nil.

At time FO, the solar panel begins to receive sunlight again. During period T5 the solar battery 10 begins to generate power. When the solar battery voltage VSC reaches a predetermined level, the bias generator 80 begins to supply the normal bias voltage to the gates G of NMOS transistors 42 and 62, these NMOS transistors turn on, current flows through the second path 40 from the solar battery 10 and through the third path 60 from the secondary battery 20, and the comparator 70 again receives input voltages VSCin and VDDin corresponding to the output voltages of the solar battery 10 and secondary battery 20. At time FI, the input solar battery voltage VSCin goes above the input secondary battery voltage VDDin (VSCin>VDDin), so as in period T1, PMOS transistor 120 turns on and power is supplied via the first path 30 to the secondary battery 20 from the solar battery 10.

As described above, during the period T4 during which the solar panel does not receive sunlight, transistors 42, 62, 100, and 120 in FIG. 2 are all switched off, leaving no path in the charging control system to conduct current from the anode 30b to the cathode 30c of the secondary battery 20, thereby solving the problem of unwanted loss of power from the secondary battery 20 when the secondary battery 20 is not being charged.

The comparator 70 in FIG. 2 operates on power supplied from the solar battery 10 via the first path 30 and a fourth path 130 connected to the first path 30. This arrangement is preferable for two reasons: first, the use of another power source to power the comparator 70 would increase the size (area and volume) of the charging control system; second, if the comparator 70 were to be powered by the secondary battery 20, it would draw current from the secondary battery 20 even while PMOS transistor 120 was switched off, causing an unnecessary discharge from the secondary battery 20. The inability of the comparator 70 to produce a high output when the output voltage of the solar battery 10 approaches zero volts is not a problem, because the output of the comparator 70 has already gone low and the gate G of NMOS transistor 100 simply remains at the low level, as desired.

Resistors 41 and 61 preferably have identical resistance values and the NMOS transistors 42 and 62 preferably have identical operating characteristics, so that the voltages of the solar battery 10 and secondary battery 20 are sensed in the same way on the second path 40 and third path 60 for input to the comparator 70.

At least one of these two resistance elements 41, 61 is preferably a variable resistor, so that even if the resistance elements 41, 61 are not identical, one of them can be adjusted to the same resistance value as the other. This adjustment can also be used to cancel an input offset voltage of the comparator 70, if such an offset is present.

The reason for placing PMOS transistor 120 in the high side section 30H of the first path 30 rather than the low side section is that if PMOS transistor 120 were located in the low side section 30L, the source and drain of PMOS transistor 120 would both be at the cathode potential of the solar battery 10 and secondary battery 20, equal to the ground level (0 V). Since the voltage applied to the gate G of PMOS transistor 120 from the comparator 70 would necessarily be equal to or greater than 0 V, PMOS transistor 120 could not be turned on.

In the first embodiment, the switching on and off of PMOS transistor 120 is controlled by the comparator 70 via resistance element 90 and NMOS transistor 100. If the output of the comparator 70 were to be directly input to the gate G of PMOS transistor 120, then after PMOS transistor 120 had been turned off to interrupt the first path, when the output voltage of the solar battery 10 fell to zero volts, because the comparator 70 is powered from the solar battery 10 via the fourth path 130, the gate G of PMOS transistor 120 would be brought to the zero volt level while the source S of PMOS transistor 120 would be at the anode potential of the secondary battery 20. The source-gate voltage of PMOS transistor 120 would therefore be equal to the output voltage of the secondary battery 20, and PMOS transistor would be turned back on.

A variation of the first embodiment will now be described with reference to FIG. 5, omitting descriptions of elements that are the same as in FIG. 2.

Figure 5:
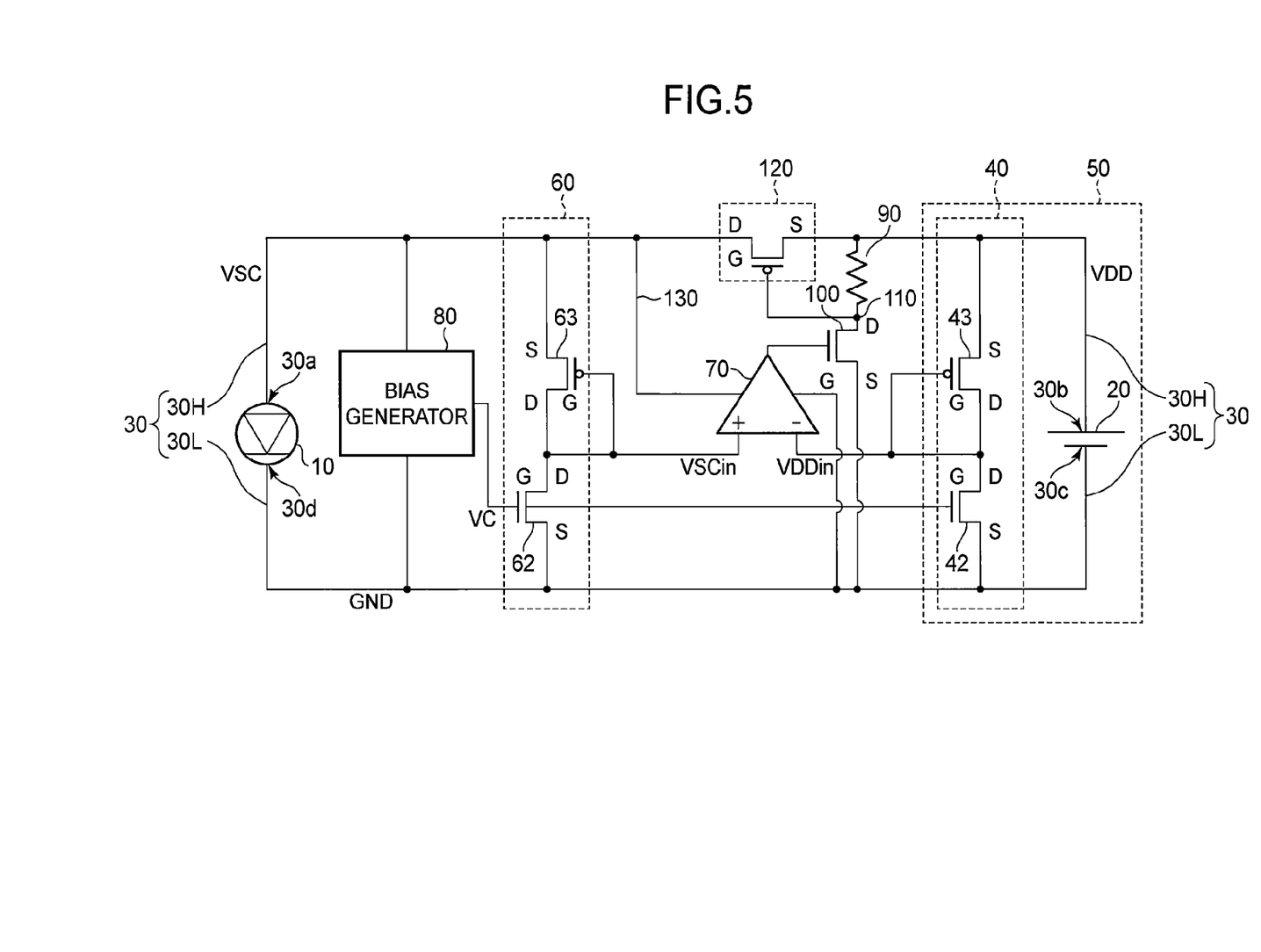
FIG. 5 is a circuit diagram illustrating a variation of the charging control system in FIG. 2.

The charging control system shown in FIG. 5 differs from the system in FIG. 2 in that resistance element 41 in the second path 40 in FIG. 2 is replaced with a PMOS transistor 43 (a first MOS transistor) and resistance element 61 in the third path 60 in FIG. 2 is replaced with a PMOS transistor 63 (a second MOS transistor).

PMOS transistor 43 is connected in series with NMOS transistor 42 in the second path 40. Specifically, the source S of PMOS transistor 43 is connected to the high side section 30H of the first path 30, and the gate G and drain D of PMOS transistor 43 are both connected to the drain D of NMOS transistor 42. The gate G of PMOS transistor 43 and the drain D of NMOS transistor 42 are therefore at the same potential. Compared with the use of resistance element 41, the use of PMOS transistor 43 enables the voltage of the secondary battery 20 to be sensed with a greater voltage drop and less current flow. To obtain similar performance with the resistance element 41 in FIG. 2, it would be necessary to increase the resistance value of resistance element 41, requiring a larger resistor that would take up more space. In FIG. 5, in which the second path 40 is configured as a constant current circuit with only MOS transistors, the physical sizes of these transistors 41, 43 can be adjusted to divide the voltage of the secondary battery 20 by a desired amount with a smaller constant current.

In the third path 60, PMOS transistor 63 is connected in series with the NMOS transistor 62. Specifically, the source S of PMOS transistor 63 is connected to the high side section 30H of the first path 30, and the gate G and drain D of the PMOS transistor 63 are both connected to the drain D of the NMOS transistor 62, placing the gate G of the PMOS transistor 63 at the same potential as the drain D of the NMOS transistor 62. The advantages gained by use of PMOS transistor 63 instead of resistance element 61 are the same as the advantages gained by use of PMOS transistor 43 instead of resistance element 41 on the second path 40.

A charging control device according to the first embodiment will be described with reference to FIG. 6. The charging control device is a semiconductor chip 140 for charging a secondary battery 20 from a solar battery 10.

The semiconductor chip 140 has first electrodes 150a and 150b electrically connected to the solar battery 10, and second electrodes 150c and 150d electrically connected to the secondary battery 20. Internally, the semiconductor chip 140 comprises the other elements shown in FIG. 2, including a first path 30 electrically connected to the electrodes 150a, 150b, 150c, 150d for transmitting power output from the solar battery 10 to the secondary battery 20, a second path 40 with a resistance element 41 and NMOS transistor 42 for sensing the output voltage of the secondary battery 20, the second path 40 being connected to the first path 30 and constituting a closed circuit 50 in combination with the first path 30 and secondary battery 20, a third path 60 with a resistance element 61 and NMOS transistor 62 for sensing the voltage of the solar battery 10, a comparator 70 for comparing the voltages of the solar battery 10 and secondary battery 20, a resistance element 90 and NMOS transistor 100 for inverting the output of the comparator 70, a PMOS transistor 120 for interrupting the first path 30 when the comparator 70 determines that the voltage of the solar battery 10 is equal to or lower than the voltage of the secondary battery 20, and a fourth path 130 by which the comparator 70 is powered from the solar battery 10.

As noted above, the semiconductor chip 140 is electrically connected to the solar battery 10 through electrodes 150a and 150b, and to the secondary battery 20 through electrodes 150c and 150d. More specifically, electrode 150a is electrically connected to the anode 30a of the solar battery 10 and to the high side section 30H of the first path 30 formed within the semiconductor chip 140; electrode 150b is electrically connected to the cathode 30d of the solar battery 10 and to the low side section 30L of the first path 30 formed within the semiconductor chip 140; electrode 150c is electrically connected to the anode 30b of the secondary battery 20 and to the high side section 30H of the first path 30 formed within the semiconductor chip 140; electrode 150d is electrically connected to the cathode 30c of the secondary battery 20 and to the low side section 30L of the first path 30 formed within the semiconductor chip 140.

Figure 6:
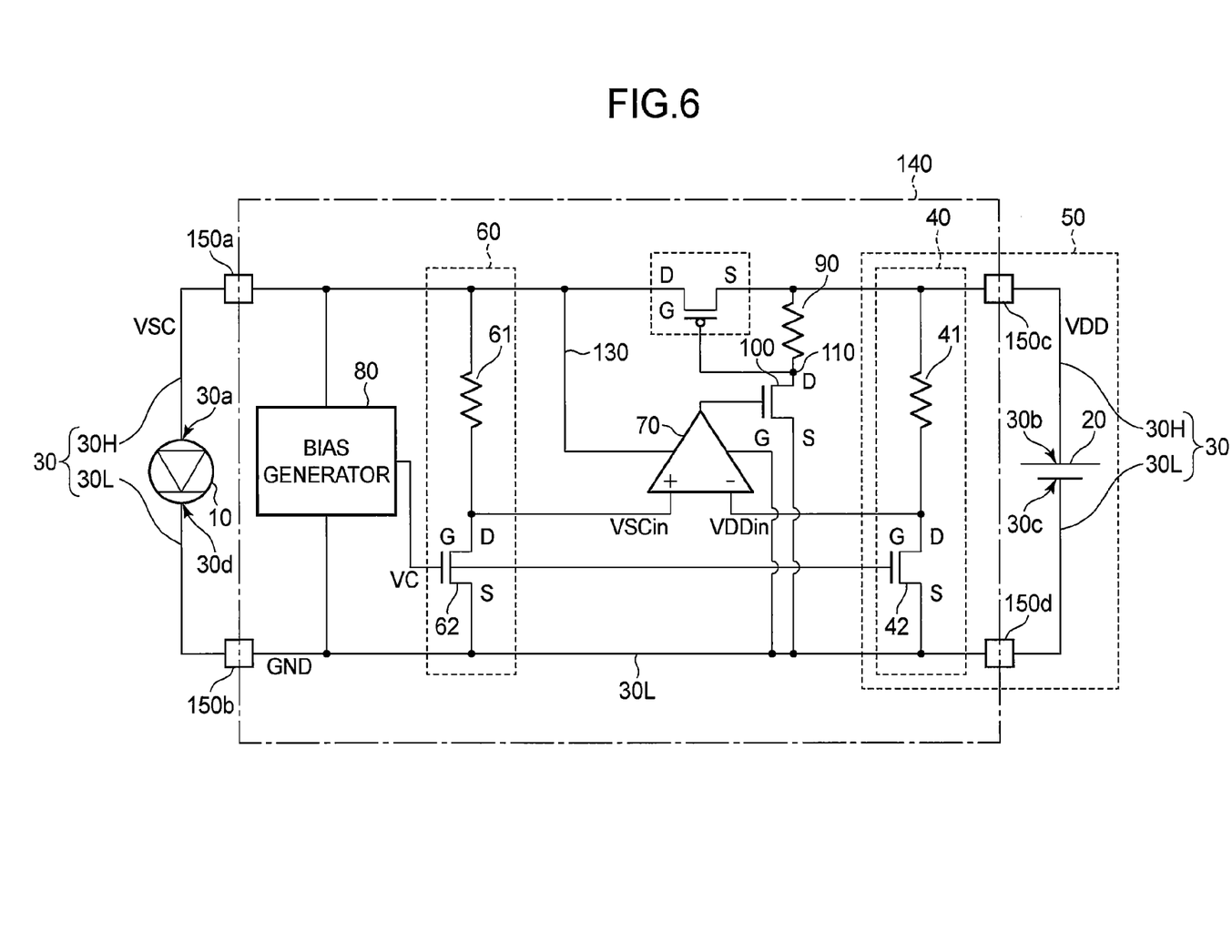
FIG. 6 is a circuit diagram illustrating a charging control device according to the first embodiment.

As a further variation, resistance elements 41 and 61 in FIG. 6 may be replaced with PMOS transistors 43 and 63 as in FIG. 5.

Second Embodiment

The second embodiment is similar to the first embodiment but reverses the roles of the high side and low side and the channel types of the MOS transistors.

Figure 7:
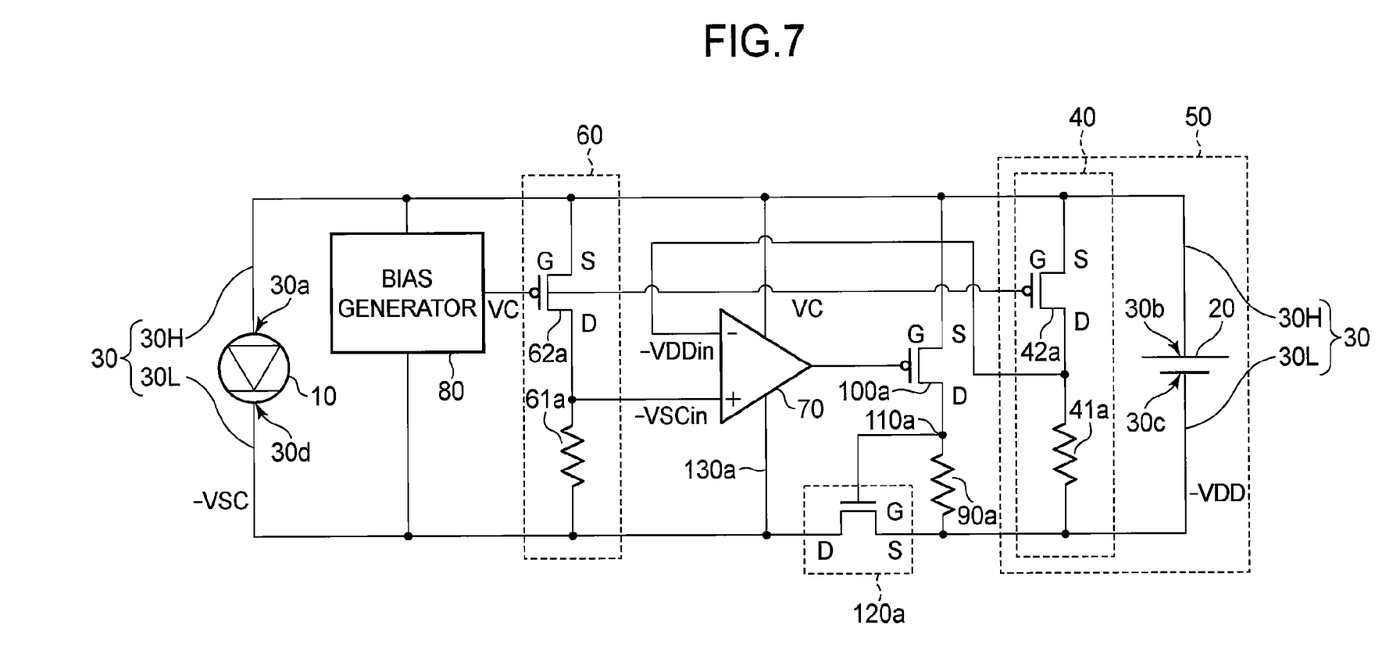
FIG. 7 is a circuit diagram illustrating a charging control system according to a second embodiment of the invention.

Referring to FIG. 7, in the second embodiment, as in the first embodiment, the charging system includes a solar battery 10 and a secondary battery 20 interconnected via a first path or charging path 30, a second path 40 forming a closed circuit 50 with the secondary battery 20 and part of the first path 30, a third path 60 forming a closed circuit with the solar battery 10 and another part of the first path 30, a comparator 70 for comparing the solar battery voltage with the secondary battery voltage, and a bias generator 80 powered by the solar battery 10. Differing from the first embodiment, a resistance element 90a and PMOS transistor 100a are connected in series between the low side section 30L and high side section 30H of the first path 30, the resistance element 90a being connected to the low side section 30L. The first interrupter is now an NMOS transistor 120a inserted in the low side section 30L to interrupt the first path 30 when the solar battery voltage is less than the secondary battery voltage. The second interrupter is now a PMOS transistor 42a that interrupts the second path 40 when solar battery 10 cannot generate enough voltage to power the bias generator 80.

The second path 40 is connected to the first path 30 in parallel with the secondary battery 20. The second path 40 includes a first resistance element 41a connected in series with PMOS transistor 42a, inserted between the low side section 30L of the first path 30 and the drain D of PMOS transistor 42a. The source S of PMOS transistor 42a is connected to the high side section 30H of the first path 30. In the closed circuit 50, PMOS transistor 42a operates as a constant current source controlled by the bias voltage VC supplied from the bias generator 80, and the resistance element 41a and PMOS transistor 42a form a voltage sensor that senses the voltage of the secondary battery 20.

The third path 60 includes a second resistance element 61a and a PMOS transistor 62a operating as a third interrupter. The third path 60 is connected to the first path 30 in parallel with the solar battery 10, at points between the solar battery 10 and the second path 40. One end of resistance element 61a is connected to the low side section 30L of the first path 30. The other end of resistance element 61a is connected to the drain D of PMOS transistor 62a. The source S of PMOS transistor 62a is connected to the high side section 30H of the first path 30. PMOS transistor 62a operates as a constant current source controlled by the bias voltage VC supplied from the bias generator 80, and resistance element 61a and PMOS transistor 62a form a voltage sensor that senses the output voltage of the solar battery 10.

The inverting input terminal (−) of the comparator 70 is connected to a node at which resistance element 41a and PMOS transistor 42a are interconnected in the second path 40. The non-inverting input terminal (+) of the comparator 70 is connected to a node at which resistance element 61a and PMOS transistor 62a are interconnected in the third path 60.

Differing from the first embodiment, since there is no switching element in the high side section 30H of the first path 30, the anodes 30a, 30b of the solar cell 10 and secondary battery 20 are always at substantially the same potential, and the voltages sensed on the first and second paths 40, 60 are referenced to this common high side potential. If the common high side potential is treated as zero volts, the cathode potentials of the solar battery 10 and secondary battery 20 are −VSC and −VDD, as indicated.

As in the first embodiment, VSC denotes the positive voltage (potential difference) between the anode 30a and cathode 30d of the solar battery 10 and VSCin denotes the fraction of this positive voltage sensed by resistance element 61a and PMOS transistor 62a. Similarly, VDDin denotes the fraction of the positive voltage difference VDD between the anode 30b and cathode 30c of the secondary battery 20 sensed by resistance element 41a and PMOS transistor 42a. When the solar battery generates sufficient voltage to charge the secondary battery 20 (when VSC>VDD), VSCin is greater than VDDin. In relation to the common high side potential (0 V), the potential (−VSCin) sensed by resistance element 61a and PMOS transistor 62a and input to the non-inverting input terminal of the comparator 70 is lower than the potential (−VDDin) sensed by resistance element 41a and PMOS transistor 42a and input to the inverting input terminal of the comparator 70, so the output of the comparator 70 is low (−VSC).

Conversely, when VSC is less than VDD and VSCin is less than VDDin (so −VSCin>−VDDin), the output of the comparator 70 is high.

The bias voltage VC generated in the bias generator 80 in the second embodiment is applied to the gates G of PMOS transistors 42a and 62a, which form a current minor as described in the first embodiment.

Normally, the bias generator 80 outputs a bias voltage VC at a substantially constant level in relation to the potential of the high side section 30H of the first path 30. In dark conditions or other conditions in which the solar battery 10 does not generate power, the bias voltage VC becomes substantially equal to the potential of the potential of the high side section 30H of the first path 30, turning off PMOS transistors 42a and 62a, so that no current flows through the second path 40 and third path 60.

Resistance element 90a, which operates as a third resistance element, has one terminal connected to the low side section 30L of the first path 30 and another terminal connected at a node 110a to the drain D of PMOS transistor 100a. The source S of PMOS transistor 100a is connected to the high side section 30H of the first path 30. The gate G of PMOS transistor 100a receives the output of the comparator 70. Resistance element 90a and PMOS transistor 100a operate as a PMOS inverter that inverts the output of the comparator 70.

NMOS transistor 120a is a switching element that interrupts the circuit formed by the solar battery 10, secondary battery 20, and first path 30 under given conditions to stop the supply of power from the solar battery 10 to the secondary battery 20. NMOS transistor 120a is inserted in series in the low side section 30L of the first path 30 at a point between the points at which the third path 60 and resistance element 90a are connected to the low side section 30L. NMOS transistor 120a has its source S connected to the part of the low side section 30L leading to the secondary battery 20, its drain D connected to the part of the low side section 30L leading to the solar battery 10, and its gate G connected to the node 110a between resistance element 90a and the drain of PMOS transistor 100a.

NMOS transistor 120a accordingly interrupts electrical conduction on the low side section 30L of the first path 30 responsive to the output of the comparator 70. When the output of the comparator 70 is high, PMOS transistor 100a turns off and the potential at node 110a drops to the cathode potential on the low side section 30L of the first path 30. The signal applied from node 110a to the gate G of NMOS transistor 120a therefore goes low and NMOS transistor 120a turns off. Conversely, when the output of the comparator 70 is low, PMOS transistor 100a turns on and the potential at node 110a is pulled up to the potential on the high side section 30H of the first path 30. The signal applied from node 110a to the gate G of NMOS transistor 120a therefore goes high, turning NMOS transistor 120a on. In short, NMOS transistor 120a turns on and off together with PMOS transistor 100a. The secondary battery 20 is charged from the solar battery 10 when NMOS transistor 120a is turned on and is not charged when NMOS transistor 120a is turned off.

The second embodiment has the advantage that the first interrupter is an NMOS transistor 120a, which need not be as large as the PMOS transistor 120 used in the first embodiment. Conversely, the second embodiment uses PMOS transistors 42a, 62a, 90a where the first embodiment uses NMOS transistors 42, 62, 90, but these transistors are relatively small because they do not have to conduct charging current, so their size has relatively little effect on the overall size of the charging control system.

Figure 8:
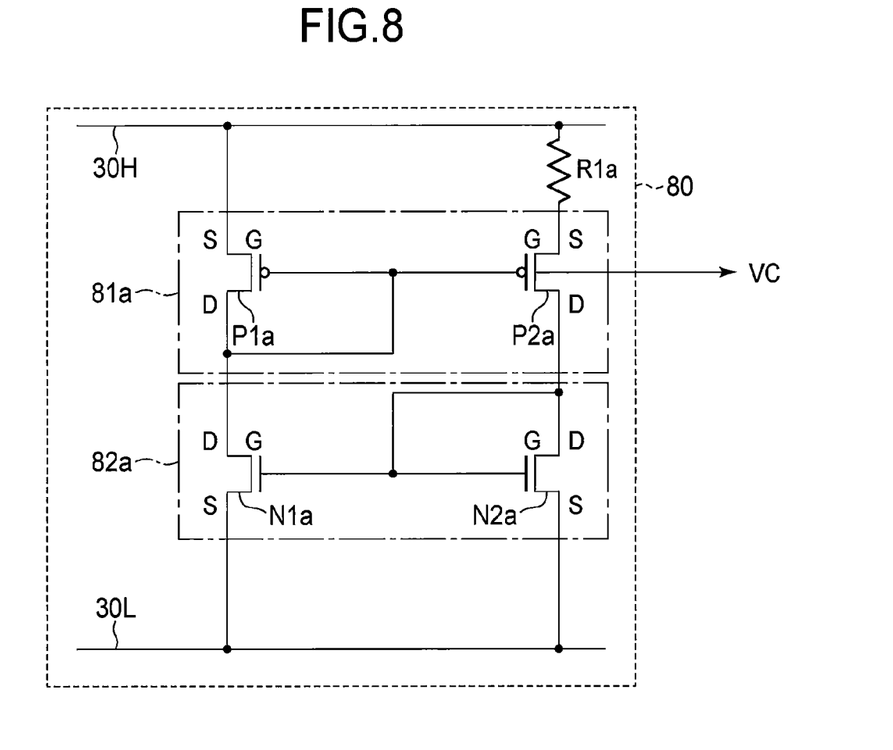
FIG. 8 is a circuit diagram illustrating the structure of the bias generator in FIG. 7 in more detail.

Referring to FIG. 8, the bias generator 80 includes a first current mirror circuit 81a, a second current mirror circuit 82a, and a resistor R1a. The current mirror circuits 81a, 81b include PMOS transistors P1a, P2a and NMOS transistors N1a, N2a interconnected as in the first embodiment, except that the sources S of both NMOS transistors N1a, N2a are connected directly to the low side section 30L of the first path 30 and resistor R1a is inserted in series between the source S of PMOS transistor P2a and the high side section 30H of the first path 30. The bias voltage VC is output from the drain of PMOS transistor P1a to the gates G of PMOS transistors 42a and 62a, which thus mirror the currents in the first current mirror circuit 81a. The bias voltage VC depends on the electrical characteristics of PMOS transistors P1a, P2a and NMOS transistors N1a, N2a and the resistance value of resistor R1a.

The operation of the charging control system in the second embodiment will now be described with reference to FIGS. 4 and 7.

In period T1 in FIG. 4, the solar battery 10 receives ample sunlight and outputs a voltage high enough to charge the secondary battery 20. The output of the solar battery 10 also enables the bias generator 80 to generate a constant bias voltage that turns on PMOS transistors 42a and 62a. Current flows through the second path 40 from the secondary battery 20 and through the third path 60 from the solar battery 10. The voltage VSC output from the solar battery 10 is greater than the voltage VDD output from the secondary battery 20 (VSC>VDD) in period T1, so the input solar battery voltage VSCin is greater than the input secondary battery voltage VDDin (VSCin>VDDin).

Accordingly, the output from the comparator 70 is low, which turns on PMOS transistor 100a and raises the potential at node 110a to the potential of the high side section 30H. The signal applied to the gate G of NMOS transistor 120a is therefore high, NMOS transistor 120a is turned on, and power is supplied to the secondary battery 20 from the solar battery 10 via the first path 30.

In periods T2, T3, and T4, the solar panel is shaded and receives diminishing sunlight, or none, and the solar battery voltage VSC drops correspondingly.

In the period T2 between times F and S, the solar battery voltage VSC remains greater than the secondary battery voltage VDD (VSC>VDD). As in period T1, current from the solar battery 10 flows through the second path 40 and current from the secondary battery 20 flows through the third path 60. The input solar battery voltage VSCin remains greater than the input secondary battery voltage VDDin (VSCin>VDDin), so the output of the comparator 70 remains low, NMOS transistor 120a remains turned on, and the solar battery 10 continues to charge the secondary battery 20 via the first path 30.

At time S, the input solar battery voltage VSCin becomes equal to the input secondary battery voltage VDDin (VSCin=VDDin). In periods T3 and T4 after time S, the input solar battery voltage VSCin is lower than the input secondary battery voltage VDDin (VSCin<VDDin).

At time S the output from the comparator 70 goes high, turning off PMOS transistor 100a, so that the potential at node 110a is pulled down through resistor 90a to the potential of the low side section 30L. The voltage applied to the gate G of NMOS transistor 120a therefore goes low, turning off NMOS transistor 120a and interrupting the flow of power to the secondary battery 20 from the solar battery 10 via the first path 30.

During the initial part of period T3, the bias generator 80 continues to generate the normal bias voltage VC, PMOS transistors 42a, 62a on the second path 40 and third path 60 remain turned on, and the comparator 70 continues to receive input voltages VSCin and VDDin corresponding to the voltages of the solar battery 10 and secondary battery 20. At some point in period T3, however, the output voltage VSC of the solar battery 10 falls to such a low level that the bias voltage VC approaches the potential level of the high side section 30H of the first path, turning off PMOS transistors 42a and 62a and interrupting the flow of current on the second path 40 and third path 60.

Since no voltage drop now occurs in resistors 41a and 61a, the inputs to the comparator 70 change to the cathode potentials of the solar battery 10 and secondary battery 20, but this does not alter the output of the comparator 70, which remains high. Transistors 100a and 120a remain turned off.

During the initial part of the transitional period T3 in which current continues to flow from the anode 30b to the cathode 30c of the secondary battery 20 on the second path 40 after the charging path 30 has been interrupted, there is a slight loss of power from the secondary battery 20, but as noted in the first embodiment, the transitional period T3 is typically short, and once PMOS transistor 42a is turned off, the power loss is substantially nil.

At time FO, the solar panel begins to receive sunlight again and the solar battery 10 begins to generate power. When the solar battery voltage VSC has risen to the necessary level, the bias generator 80 begins to supply the normal bias voltage to the gates G of the PMOS transistors 42a and 62a, these PMOS transistors turn on, a constant current from the solar battery 10 flows through the second path 40, a constant current from the secondary battery 20 flows through the third path 60 from the secondary battery 20, and the comparator 70 again receives input voltages VSCin and VDDin corresponding to the output voltages of the solar battery 10 and secondary battery 20. At time FI, the input solar battery voltage VSCin goes above the input secondary battery voltage VDDin (VSCin>VDDin), so as in period T1, NMOS transistor 120a turns on and the solar battery 10 begins charging the secondary battery 20 via the first path 30.

As described above, during the period T4 in which the solar panel does not receive sunlight, transistors 42a, 62a, 100a, and 120a in FIG. 7 are all switched off, leaving no path in the charging control system to conduct current from the anode 30b to the cathode 30c of the secondary battery 20, thereby solving the problem of unwanted loss of power from the secondary battery 20 when the secondary battery 20 is not being charged.

The comparator 70 in HG. 7 operates on power supplied from the solar battery 10 via the first path 30 and a fourth path 130a connected to the first path 30. This arrangement is preferable for the same reasons as in the first embodiment.

Resistance elements 41a and 61a preferably have identical resistance values and the PMOS transistors 42a and 62a preferably have identical operating characteristics, so that the voltages of the solar battery 10 and secondary battery 20 are sensed in the same way on the second path 40 and third path 60 for input to the comparator 70.

At least one of these two resistance elements 41a, 61a is preferably a variable resistor that can be adjusted to compensate for possible differences between resistance elements 41a and 61a, and for the input offset voltage (if any) of the comparator 70.

The reason for placing NMOS transistor 120a in the low side section 30L of the first path 30 rather than the high side section 30H is that if NMOS transistor 120a were located in the high side section 30H, the source and drain of NMOS transistor 120a would both be at the anode potential of the solar battery 10 and secondary battery 20. Since the potential applied to the gate G of NMOS transistor 120a from the comparator 70 would necessarily be equal to or lower than these potentials, NMOS transistor 120a could not turn on.

In the second embodiment, the switching on and off of NMOS transistor 120a is controlled by the comparator 70 via the resistance element 90a and PMOS transistor 100a. If the output of the comparator 70 were to be supplied directly to the gate G of NMOS transistor 120a, then after NMOS transistor 120a had been turned off to interrupt the first path 30, when the output voltage of the solar battery 10 fell to zero volts, making the cathode and anode potentials of the solar battery both equal to the common potential of the high side section 30H of the first path 30, the output of the comparator 70, which is powered from the solar battery 10 via the fourth path 130a, would necessarily be at this common high-side potential. The NMOS transistor 120a would then turn back on, because its gate-source voltage would be equal to the output voltage of the secondary battery 20.

A variation of the charging control system in the second embodiment will now be described with reference to FIG. 9, omitting descriptions of elements that are the same as in FIG. 7.

Figure 9:
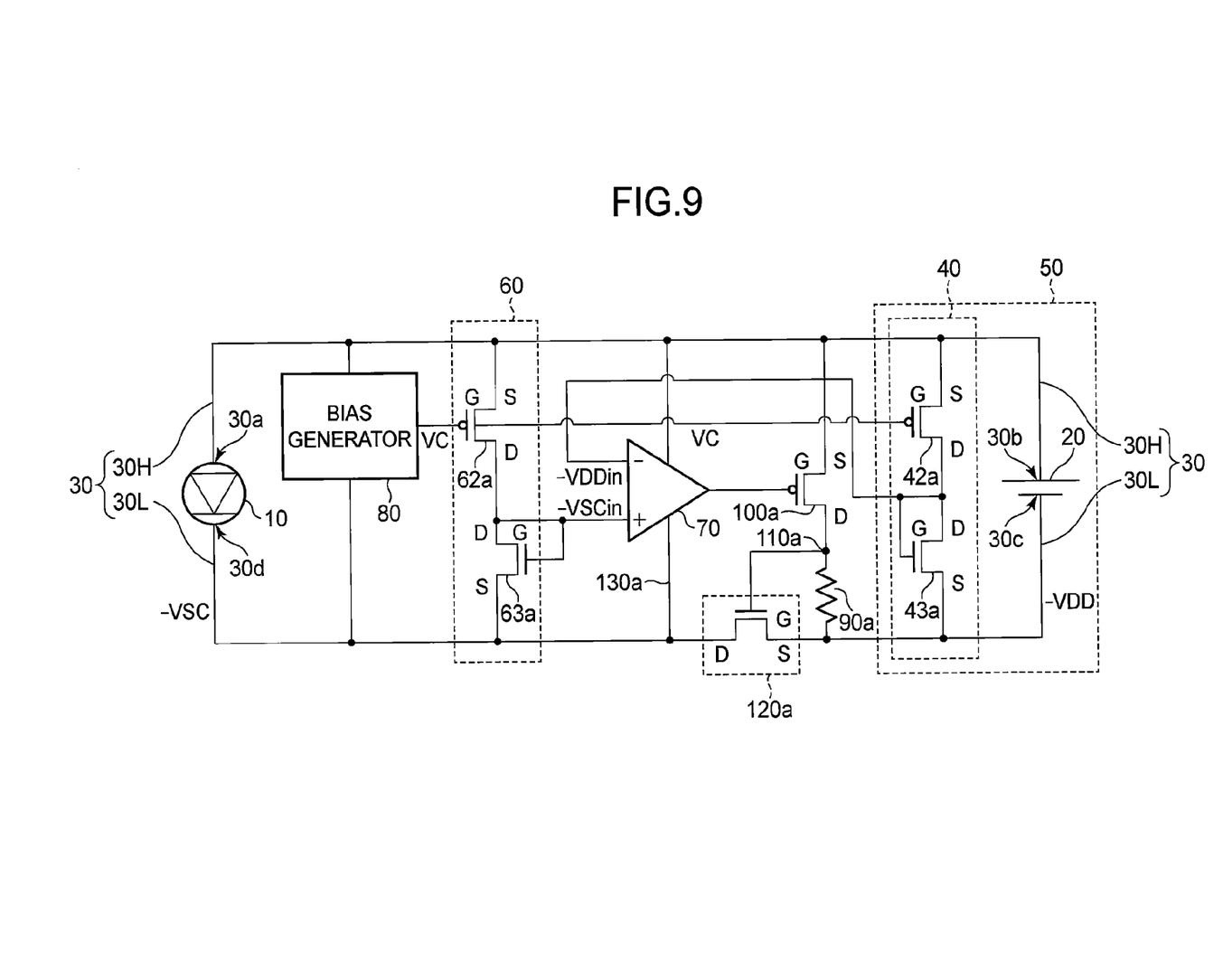
FIG. 9 is a circuit diagram illustrating a variation of the charging control system in FIG. 7.

The charging control system shown in FIG. 9 differs from the system in FIG. 7 in that the resistance element 41a in the second path 40 in FIG. 7 is replaced with an NMOS transistor 43a (a first MOS transistor) and the resistance element 61a in the third path 60 in FIG. 7 is replaced with an NMOS transistor 63a (a second MOS transistor).

NMOS transistor 43a is connected in series with PMOS transistor 42a in the second path 40. Specifically, the source S of NMOS transistor 43a is connected to the low side section 30L of the first path 30, and the gate G and drain D of NMOS transistor 43a are both connected to the drain D of PMOS transistor 42a, and to the inverting input terminal of the comparator 70. Compared with the use of resistance element 41a, the use of NMOS transistor 43a enables the voltage of the secondary battery 20 to be sensed with a greater voltage drop and less current. The advantages gained by use of NMOS transistor 43a instead of resistance element 41a on the second path 40 are the same as the advantages gained by use of PMOS transistor 43 instead of resistance element 41 on the second path 40 in the first embodiment.

In the third path 60, NMOS transistor 63a is connected in series with the PMOS transistor 62a. Specifically, the source S of NMOS transistor 63a is connected to the low side section 30L of the first path 30, and the gate G and drain D of the NMOS transistor 63a are both connected to the drain D of the PMOS transistor 62a and the non-inverting input terminal of the comparator 70. The use of NMOS transistor 63a instead of resistance element 61a provides the same advantages as the use of NMOS transistor 43a instead of resistance element 41a on the second path 40.

A charging control device according to the second embodiment will be described with reference to FIG. 10. This charging control device is a semiconductor chip 140a for charging a secondary battery 20 from a solar battery 10.

The semiconductor chip 140a has first electrodes 150aa and 150ab electrically connected to the solar battery 10, and second electrodes 150ac and 150ad electrically connected to the secondary battery 20. Internally, the semiconductor chip 140a comprises the other elements shown in FIG. 2, including a first path 30 electrically connected to electrodes 150aa, 150ab, 150ac, 150ad for transmitting power output from the solar battery 10 to the secondary battery 20, a second path 40 with a resistance element 41a and PMOS transistor 42a for sensing the output voltage of the secondary battery 20, the second path 40 being connected to the first path 30 and constituting a closed circuit 50 in combination with the secondary battery 20 and part of the first path 30, a third path 60 with a resistance element 61a and PMOS transistor 62a for sensing the voltage of the solar battery 10, a comparator 70 for comparing the voltages of the solar battery 10 and secondary battery 20, a resistance element 90a and PMOS transistor 100a for inverting the output of the comparator 70, an NMOS transistor 120a for interrupting the first path 30 when the comparator 70 determines that the solar battery voltage is equal to or lower than the secondary battery voltage, and a fourth path 130a by which the comparator 70 is powered from the solar battery 10.

As noted above, the semiconductor chip 140a is electrically connected to the solar battery 10 through electrodes 150aa and 150ab, and to the secondary battery 20 through electrodes 150ac and 150ad. Electrode 150aa is electrically connected to the anode 30a of the solar battery 10 and to the high side section 30H of the first path 30 formed within the semiconductor chip 140a; electrode 150ab is electrically connected to the cathode 30d of the solar battery 10 and to the low side section 30L of the first path 30 formed within the semiconductor chip 140a; electrode 150ac is electrically connected to the anode 30b of the secondary battery 20 and to the high side section 30H of the first path 30 formed within the semiconductor chip 140a; electrode 150ad is electrically connected to the cathode 30c of the secondary battery 20 and to the low side section 30L of the first path 30 formed within the semiconductor chip 140a.

Figure 10:
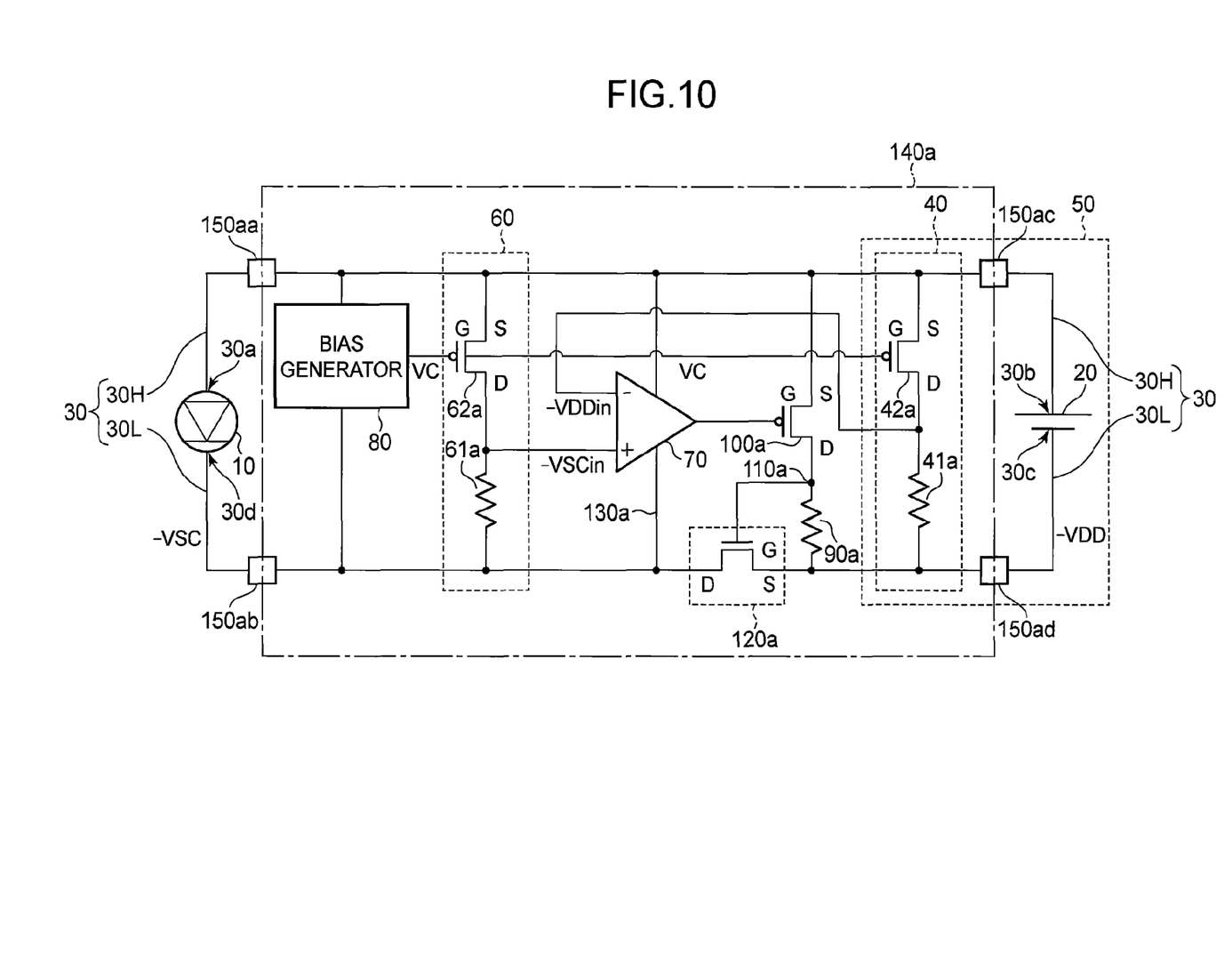
FIG. 10 is a circuit diagram illustrating a charging control device according to the second embodiment.

As a further variation, resistance elements 41a and 61a in FIG. 10 may be replaced with NMOS transistors 43a and 63a as in FIG. 9.

Those skilled in the art will recognize that still further variations of the preceding embodiments are possible within the scope of the invention, which is defined in the appended claims.

What is claimed is:

1. A semiconductor device comprising:
a first interrupter connected to a first terminal electrically connected to an anode of a secondary battery and a second terminal electrically connected to a cathode of the secondary battery, the first interrupter switching a first path connecting the first terminal and the second terminal between an electrically connected state and an electrically interrupted state on the basis of a bias voltage;
a second interrupter connected to a third terminal electrically connected to an anode of a solar battery and the first terminal, the second interrupter switching a second path connecting the third terminal and the first terminal between an electrically connected state and an electrically interrupted state on the basis of a result of comparison between a first control voltage based on an output of the secondary battery and a second control voltage based on an output of the solar battery; and
a constant current biasing circuit electrically connected to the third terminal, the constant current biasing circuit generating the bias voltage based on the output of the solar battery.

2. The semiconductor device of claim 1, wherein:
the first interrupter includes a resister and a transistor connected in series to each other in the first path between the first terminal and the second terminal;
the switching in the first interrupter is performed by the transistor; and
the first control voltage based on the output of the secondary battery is a voltage at a connection point between the resistor and the transistor.

3. The semiconductor device of claim 1, wherein the second interrupter includes:
a comparator comparing the first control voltage based on the output of the secondary battery and the second control voltage based on the output of the solar battery, thereby outputting the result of comparison; and
a first transistor connected between the third terminal and the first terminal, the first transistor switching the second path connecting the third terminal and the first terminal between the electrically connected state and the electrically interrupted state on the basis of the result of comparison output from the comparator.

4. The semiconductor device of claim 3, wherein:
the second interrupter further includes a resister and a second transistor connected in series to each other in a third path connecting the first terminal and the second terminal;
the second transistor switches the third path between an electrically connected state and an electrically interrupted state on the basis of the result of comparison output from the comparator; and
the switching in the first transistor is performed on the basis of a voltage at a connection point between the resistor and the second transistor.

5. The semiconductor device of claim 1, further comprising:
a third interrupter connected to a third path connecting the third terminal and the second terminal; wherein
the third interrupter includes a resister and a transistor connected in series to each other in the third path between the third terminal and the second terminal;
the transistor switches the third path between an electrically connected state and an electrically interrupted state on the basis of the bias voltage; and
the second control voltage based on the output of the solar battery is a voltage at a connection point between the resistor and the transistor.

6. A charging control system comprising:
a secondary battery;
a solar battery for charging the secondary battery with power;
a first interrupter connected to a first terminal electrically connected to an anode of the secondary battery and a second terminal electrically connected to a cathode of the secondary battery, the first interrupter switching a first path connecting the first terminal and the second terminal between an electrically connected state and an electrically interrupted state on the basis of a bias voltage;

a second interrupter connected to a third terminal electrically connected to an anode of the solar battery and the first terminal, the second interrupter switching a second path connecting the third terminal and the first terminal between an electrically connected state and an electrically interrupted state on the basis of a result of comparison between a first control voltage based on an output of the secondary battery and a second control voltage based on an output of the solar battery; and a constant current biasing circuit electrically connected to the third terminal, the constant current biasing circuit generating the bias voltage based on the output of the solar battery.

7. The charging control system of claim 6, wherein:
the first interrupter includes a resister and a transistor connected in series to each other in the first path between the first terminal and the second terminal;
the switching in the first interrupter is performed by the transistor; and
the first control voltage based on the output of the secondary battery is a voltage at a connection point between the resistor and the transistor.

8. The charging control system of claim 6, wherein the second interrupter includes:
a comparator comparing the first control voltage based on the output of the secondary battery and the second control voltage based on the output of the solar battery, thereby outputting the result of comparison; and a first transistor connected between the third terminal and the first terminal, the first transistor switching the second path connecting the third terminal and the first terminal between the electrically connected state and the electrically interrupted state on the basis of the result of comparison output from the comparator.

9. The charging control system of claim 8, wherein:
the second interrupter further includes a resister and a second transistor connected in series to each other in a third path connecting the first terminal and the second terminal;
the second transistor switches the third path between an electrically connected state and an electrically interrupted state on the basis of the result of comparison output from the comparator; and
the switching in the first transistor is performed on the basis of a voltage at a connection point between the resistor and the second transistor.

10. The charging control system of claim 6, further comprising:
a third interrupter connected to a third path connecting the third terminal and the second terminal; wherein
the third interrupter includes a resister and a transistor connected in series to each other in the third path between the third terminal and the second terminal;
the transistor switches the third path between an electrically connected state and an electrically interrupted state on the basis of the bias voltage; and
the second control voltage based on the output of the solar battery is a voltage at a connection point between the resistor and the transistor.

* * * * *